United States Patent [19]
Wakatsuki et al.

[11] 3,852,078
[45] Dec. 3, 1974

[54] MASS OF POLYCRYSTALLINE CUBIC SYSTEM BORON NITRIDE AND COMPOSITES OF POLYCRYSTALLINE CUBIC SYSTEM BORON NITRIDE AND OTHER HARD MATERIALS, AND PROCESSES FOR MANUFACTURING THE SAME

[76] Inventors: Masao Wakatsuki, 62 Ichizawa-cho, Asohi-ku, Yokohama; Kazuaki Ichinose, 6278 Ohba, Fujisawa-shi, Kanagawa-ken; Riyuitiro Mori, 1-22, Komukainishimachi, Kawasaki-shi; Toshio Aoki, 3-7, Shiomidai, Isogo-ku, Yokohama-shi, all of Japan

[22] Filed: Dec. 23, 1971

[21] Appl. No.: 211,564

[30] Foreign Application Priority Data
Dec. 24, 1970   Japan............................... 45-117230
Dec. 30, 1970   Japan............................... 45-122892
Dec. 30, 1970   Japan............................... 45-122906

[52] U.S. Cl.................... 106/43, 106/44, 106/55, 106/56, 106/57, 106/65, 106/66, 106/69, 51/307, 51/309
[51] Int. Cl............................................. C04b 35/52
[58] Field of Search............ 106/43, 44, 55, 56, 65, 106/66, 69; 423/289, 290; 51/307, 309

[56] References Cited
UNITED STATES PATENTS
| | | | |
|---|---|---|---|
| 2,872,327 | 2/1959 | Taylor | 106/55 |
| 2,887,393 | 5/1959 | Taylor | 106/55 |
| 2,888,355 | 5/1959 | Taylor | 106/43 |
| 3,233,988 | 2/1966 | Wentorf et al. | 423/290 |
| 3,256,103 | 6/1966 | Roche et al. | 106/55 |
| 3,291,622 | 12/1966 | Mandorf et al. | 106/55 |
| 3,514,271 | 5/1970 | Yates | 106/55 |
| 3,544,486 | 12/1970 | Passmore | 106/55 |

Primary Examiner—J. Poer
Attorney, Agent, or Firm—Flynn & Frishauf

[57] ABSTRACT

This invention gives bonded or compact bodies of polycrystalline cubic system boron nitride and substantially uniform composites of polycrystalline cubic system boron nitride and other hard materials, for example, metal borides, such as titanium boride and zirconium boride, covalent or metallic cabides, such as boron carbide, silicon carbide, titanium, carbide, tungsten carbide and chromium carbide, metal nitrides, such as titanium nitride, tantalum nitride, silicon nitride and aluminum nitride, metal oxides, such as alumina and silica, complex oxide such as garnet and agate, and diamond. Further, this invention provides a process of obtaining the bonded body of these materials which comprises subjecting hexagonal system boron nitride powder, or a mixture of hexagonal system boron nitride powder and cubic system boron nitride crystal powder or powders of the above-mentioned hard materials to high temperatures and high pressures.

12 Claims, 5 Drawing Figures

FIG. 1    FIG. 2    FIG. 3
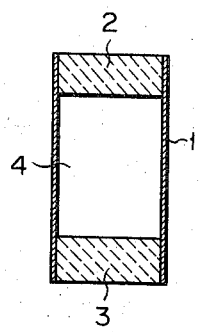 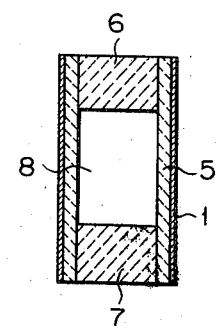 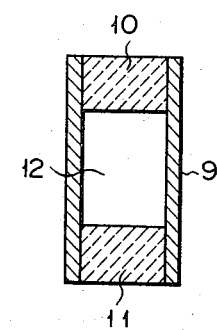
FIG. 4    FIG. 5
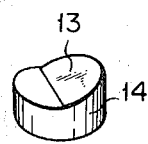 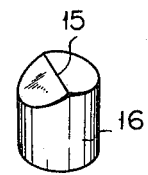

MASS OF POLYCRYSTALLINE CUBIC SYSTEM BORON NITRIDE AND COMPOSITES OF POLYCRYSTALLINE CUBIC SYSTEM BORON NITRIDE AND OTHER HARD MATERIALS, AND PROCESSES FOR MANUFACTURING THE SAME

BACKGROUND OF THE INVENTION

This invention relates to the uniform composite, as well as its manufacturing process, of polycrystalline cubic system boron nitride and other powderous hard materials, and to processes for manufacturing polycrystalline cubic system boron nitride.

Diamond and cubic system boron nitride crystals are well known as materials having excellent chemical and thermal stabilities, and high hardnesses. In addition to the above-mentioned two hard materials, there are well known borides, carbides and oxides as well as their complexes. Examples of these hard materials are titanium boride, boron carbide, silicon carbide, tungsten carbide, titanium nitride, aluminum nitride, alumina, silica, iron oxide, chromium oxide, and the complexes comprising garnet and agate. These hard materials, which may be in the form of single crystal, fused body or sintered lump, are used, for example, a grinding material in powder forms, and as cutting edges of machine tools, dies, and corrosion- or wear-resistant parts of many types of machines or instruments. Of the above-mentioned hard materials, diamond and cubic system boron nitride are most excellent in corrosion-resistance and hardness, particularly the hardness being rates as 6000 – 9000 Kg/mm$^2$ on the Knoop scale. Substances next to the above two, such as boron carbide, silicon carbide and alumina, are markedly inferior in hardness as shown in Table 1, in which Knoop hardnesses of typical hard materials are given for reference.

Table 1

| Name of Material | Knoop Hardness (Kg/mm$^2$) |
| --- | --- |
| quartz (SiO$_2$) | 800 |
| ZrN | 1510 |
| ZrB | 1560 |
| TiN | 1770 |
| WC | 1870 |
| Al$_2$O$_3$(Fused alumina) | 2000 |
| ZrC | 2000 |
| SiC | 2550 |
| TiB$_2$ | 2710 |
| B$_4$C | 2800 |
| Diamond | >7000 |

Utilization of the conventionally well known hard materials as mentioned above contains the following problems.

1. Although alumina (Al$_2$O$_3$), silicon carbide and boron carbide are low in cost, they are very inferior to diamond and cubic system boron nitride with respect to hardness. On the other hand diamond and cubic system boron nitride crystals, especially those in large size, are very expensive.

2. There is a wide gap in hardness between diamond or cubic system boron nitride and B$_4$C or SiC, but no materials shown an intermediate hardness have been available up to now.

3. Diamond and cubic system boron nitrides are most excellent as machine tool materials but it is difficult to work them into desired shapes. Therefore, if a material fairly harder than SiC and B$_4$C, though somewhat lower in hardness than diamond, is available inexpensively, it should be very useful as a machine tool material.

4. Diamond is most important as the material for an industrial grinding and cutting tools. But since the natural output of large grain diamonds suitable for bits, cutters and dies is particularly small and it is difficult to synthesize them artificially, they have been very costly materials. Most large grain diamonds naturally produced are of single crystals and have the cleavage property, so they are poor in toughness. In contrast to them, a polycrystalline material with a fine and dense texture (Carbonado) has no cleavage property but is rich in toughness, so it is particularly excellent as a machine tool material. But the output of carbonado is too small to meet the requirement. Therefore, it has been craved for many years to obtain artifically a large lump of diamond or a hard material comparable to that, which is, moreover, of a fine and dense polycrystalline texture. But no effective process of manufacturing such a material has yet been found. Further, diamond is defective in that it becomes unusable due to the drastic wear and tear as it is used for grinding or cutting steel. Like diamond, cubic system boron nitride crystals are easily cleaved along some crystal planes due to its inherent property with a resultant disadvantage that it has little toughness in a form of single crystal. Accordingly, a fine and dense polycrystalline lump of cubic system boron nitride is also desired for.

SUMMARY OF THE INVENTION

The object of this invention is to give a large sized, lump or mass of hard material bonded with polycrystalline cubic system boron nitride. "Hard materials" referred to in this specification denote those having been suitably used as grinding materials so far, for example, borides of titanium, zirconium, hafnium, vanadium, niobium, tantalum, chromium, molybdenum and tungsten, likewise carbides of these metals, nitrides of these metals, boron carbide, silicon carbide, aluminum nitride, silicon nitride, alumina, silica, iron oxide chromic oxide, diamond, cubic system boron nitride and complexes of oxides comprising garnet and agate, and all other materials having hardness higher than or equal to those listed above. Now, it is often the case where a small quantity of B$_2$O$_3$ (boric oxide) is contained in a hexagonal system (graphite-like) boron nitride for convenience of turning it into a sintered body, or as an impurity. But, in this specification B$_2$O$_3$ will be excluded from the definition of "hard material."

Another object of this invention is to give an economically advantageous polycrystalline cubic system boron nitride in a lump form which is hard enough against boron carbide, silicon carbide and alumina and which, by use of diamond, can easily be worked and fabricated, and offers a wider usage of a highly hard, corrosion- and heat- resistant material by extensive varieties in its properties.

Further, this invention was carried out to meet the above-described desire and has an object of furnishing a firm lump of diamond powder cemented with cubic system boron nitride, along with the process of manufacturing the said lump of cemented diamond powder.

Another object of this invention is to provide hard lump form polycrystalline cubic system boron nitride comparable to diamond in hardness and its manufacturing processes.

Namely, by this invention, it is possible to convert hexagonal system boron nitride into polycrystalline cubic system boron nitride by keeping hexagonal system boron nitride powder or a mixture, obtained by adding the said hard materials in powder forms to the said hexagonal system boron nitride, at such high temperatures and high pressures as can make the cubic system boron nitride be a thermodynamically stable phase, consolidate the said hexagonal system boron nitride powder or the said mixture and obtain a mass of polycrystalline cubic system boron nitride or a lump in which the said hard materials are cemented with and dispersed uniformly in the said polycrystalline subic system boron nitride.

BRIEF DESCRIPTION OF THE DRAWING

FIGS. 1 to 3 give sections of the examples of the containers arranged in the high pressure devices in this invention;

FIG. 4 is likewise a diagonal view showing an example of an end plug in the container; and FIG. 5 is a diagonal view showing an example of the consolidated lump body obtained by this invention.

DETAILED DESCRIPTION OF THE INVENTION

Below are explained the raw materials used in this invention and the manufacturing conditions.

i. Hexagonal system boron nitride used as the raw material

This is converted into polycrystalline and hard cubic system boron nitride by high pressure and high temperature treatment and becomes the matrix, cementing particles of the total constituents or the fillers of hard material and filling gaps among the particles in the production of this invention. There is no definite limit to the kind of the raw materials hexagonal system boron nitride powders, but those with their primary particles of low crystallinity are desirable. It is difficult to express the crystallinity quantitatively, but generally the larger the primary particles are in size, the more crystallized they tend to be. Powders less than 3 microns are generally suitable for the use, those of one micron or less being particularly desirable. However, powders of more than 3 microns may be employed if the powders are mixed with powders of less than 3 microns. The selection of the quality of the hexagonal system boron nitride powders is important, because hexagonal system boron nitride of high crystallinity, wherein most of primary particles have been developed to exceed approximately 3 microns, requires pressures more than 100 K bar in the conversion from hexagonal system to cubic system. In consequence, a synthesizing device capable of producing particularly high pressures is required. As its life (number of uses) is short under such a severe condition, the process is of no practical merit. But, by the selection of the raw materials mentioned above, the pressure required to convert them into cubic system can be lowered to less than 100 K bar. Accordingly, many types of high pressure and high temperature devices developed so far can be utilized to make the manufacturing processes sufficiently practical.

ii. Hard materials to be added

The types of hard materials used as fillers in this invention are as follows. As oxides, $BeO$, $Ce_2O_3$, $ZrO_2$, $ThO_2$, $Cr_2O_3$, $NiO$, $Fe_2O_3$, $Al_2O_3$ $SiO_2$ and their complexes, for example, agate and garnet are avaiable.

As nitrides, nitrides of Ti, Zr, Hf, V Nb, Ta, Cr, Mo and W, and, in addition, $A1N$ and $Si_3N_4$ are aviable.

As carbides, carbides of Ti, Zr, Hf, V, Nb, Ta, Cr, Mo and W, and, in addition, $B_4C$ and $SiC$ are aviable.

As boron compounds, borides of Ti, Zr, Hf, V, Nb, Ta, Cr, Mo and W, and, in addition, cubic system boron nitride powder are available.

In addition, natural and synthesized diamonds of good quality crystals and those in irregular or dendritic forms can be used. Moreover, besides those of the conventional cubic structure, those of wurtzite-like structure can be used.

There are no particular limits to the sizes and shapes of the particles of these hard materials, but small-particled materials should desirably be used to obtain the products with fine textures. Those less than 10 microns are generally desirable.

Also, in order to improve the bonding of these hard materials with cubic system boron nitride converted from hexagonal system boron nitride, these hard materials may be preferably subjected to such pretreatments as removal of impurities on their surfaces and activation of their surfaces by cleaning or heating in high vacuum or in hydrogen gas flow.

iii. Mixing ratios

The mixing ratios can be selected over a wide range and no criticality is found to limit them. Hardness and other physical and chemical properties of the product can be modified, according to its uses, in a variety of ways by changing kinds and mixing ratios of the fillers.

When diamond is used as the filler, it is desirable to add hexagonal system boron nitride in an amount of more than 10 percent, preferably more than 20 percent of the whole amount of the composite to be obtained, for assurance of bonding. On the other hand, there is no upper limit to the addition of the hexagonal system boron nitride. The reason is as follows. Cubic system boron nitride itself has a hardness comparable to diamond, and its dense polycrystalline lumps have properties and effects similar to those of polycrystalline diamond. Properties of the composite to be obtained is varied continuously according to its composition, from the case in which the properties of the fillers prevails, till the case in which those of cubic system boron nitride prevails completely. But the effects or advantages as a superhard material with toughness are always available in spite of the mixing ratio.

Addition of the third material other than the hexagonal system boron nitride and the diamond in the raw material can be carried out unless the objectives of the processes in this invention are lost. Particularly, on some occasions a tool cuts rather well when its material contains those lower in hardness than diamond and cubic system boron nitride. Therefore, hard materials other than diamond and cubic system boron nitride may be safely incorporated. And, in some cases, cementation in lumps of the composite is carried out more easily with the addition of such transition elements as Ti, Zr, Hf, V, Nb, Ta, Cr, Mo, W or Fe. Further, it is also possible to modify the specific gravity of the composites by mixing such powders as tungsten carbide.

It should be easily understood that the composite lump is connected to a pure polycrystalline cubic system boron nitride lump derived from pure hexagonal boron nitride, at the bottom limit of the addition ratio of the fillers. In that case, the hexagonal boron nitride is limited, in this invention, to powders of less than 3 microns, more preferably powders of less than one micron.

iv. Pressure and temperature conditions

Pressure of at least 50 Kbar is required and preferably pressure of more than 60 Kbar is applied to carry out the precesses in this invention. The temperature should be higher than 1,100°C. These conditions result from the aforesaid conversion of hexagonal system boron nitride into cubic system. And combination of pressure and temperature should be so selected that the cubic system boron nitride becomes the thermodynamically stable phase, from the necessity of carrying out the conversion. The condition to realize thermodynamical equlibrium between the both system of boron nitride is well known already.

Pressures described in this specification were evaluated by means of the pressure-induced phase transitions of bismuth (1-2), thallium, barium and bismuth 3-5), the transition pressure of which were assumed to be 25.4, 37, 59 and 89 K bar, respectively. Error or uncertainty of some extent may be involved in the referred values of pressure. The temperature was measured directly by a thermo-couple of platinum and platinum-rhodium (13percent), or estimated from the relation between the output of the thermocouple and the heating electric power input.

In the actual manufacture, it is easy to regualte the heating power for individual synthesizing devices to realize the manufacture of lumps and select the appropriate heating conditions.

Although it is not perfectly elucidated by what actions or reactions the lumps of polycrystalline cubic system boron nitride or of cemented composite are formed in the processes in this invention, it is believed that (1); hexagonal system boron nitride must be converted into cubic system by a solid-to-solid phase transformation, which is one of the major effects of the actions in the processes in this invention. By this process is formed cubic system boron nitride which constitutes a matrix having a fine and dense polycrystalline texture in which the hard materials constituting fillers are uniformly dispersed and cemented. This process is not a simple sintering, but is accompanied by the intersolid phase transformation in which rearrangement of atoms in the matrix is involved. Thus it is considered that the bonding in the matrix and between the matrix and the fillers are easily and firmly realized.

(2) In case that the fillers, that is, hard materials are added by a small mixing ratio, the properties of the lumps are akin to those of the matrix (polycrystalline cubic system boron nitride) itself and the lumps become very hard materials. And as the mixing ratio increases, the properties are flavored with those of the fillers. For example, a lump added with alumina or silica can be made fairly harder than silicon carbide and boron carbide, being superior to them as a tool material, but it is somewhat lower in hardness than diamond or pure cubic system boron nitride with which it can be shaped or polished easily. When nickel oxide (NiO) is mixed, a magnetic ultra-hard material is obtained, because NiO is transformed into a ferro-magnetic phase under high pressure and at high temperature. Further, in the case of a filler of a high specific gravity such as tungsten carbide, a fairly heavier lump than pure polycrystalline cubic system boron nitride is obtained. Thus, the possibility of modifying the hardness and other properties of a lump in sucession depending upon the kind and amount of the filler is one of the merits of the manufacturing process of such polycrystalline cubic system boron nitride in this invention.

(3) Further, the third materials added help make the bonding among the filler particles, in the matrix or between the both easier in some cases.

The consolidated lump of cubic system boron nitride added with diamond, obtained by the processes in this invention, have the following advantages. (1) High hardness comparable to that of diamond.

(2) Without cleavages inherent in a single crystal but rich in toughness. (3)Remarkably less expensive than the same sized diamond of single crystals. (4) Very stable against such thermal shocks as abrupt heating and cooling, particularly more stable than diamond on heating in an oxidizing atmosphere it is by no means attacked, or remarkably highly resistive against corrosion in contrast with diamond.

(6) Use of no catalysts results in effective utilization of the capacity of a high pressure and high temperature container, and also allows to produce easily large-sized lumps in any shapes desired.

The following features are thought of or demonstrated as the reasons bringing forth such advantages.

1. Cubic system boron nitride is primarily as hard as diamond (diamond is 5800 –8500 in Knoop hardness and boron nitride 6000 –8000) and almost equal in density; diamond is 3.515 g/cm$^3$ in density and the theoretical value of cubic system boron nitride is 3.48 g/cm$^3$. The actual experimental value of the pure polycrystalline cubic system boron nitride (containing no diamond) synthesized by one of the processes of this invention is 3–3.48 depending upon the conditions of synthesis, exceeding 3.47 in many cases. Since spaces among the particles of diamond is filled with such cubic system boron nitride, the diamond-containing lump obtained by the processes in this invention is considered to be a uniform and extremely hard material.

2. Cubic system boron nitride and diamond have the entirely same crystal structures and the lattice constants of them both are almost equal (diamond: 3.57 A; boron nitride: 3.62 A). Further, both are isotropic materials and very small in thermal expansion coefficients. These facts are evidently advantageous in strengthening the bonded lump of them both and making them resistive against thermal shock.

3. Because hexagonal system boron nitride used as the raw material is such a soft and slippery material as may be used as a lubricating agent, the starting materials in the processes in this invention are assuredly compressed into a dense state, the gaps among the filler particles being thereby efficiently filled. Thus a lump of a density close to the theoretical value is obtained advantageously.

4. Further, as the bonding reaction in the processes in this invention is not a simple sintering but is accompanied by an inter-solid phase transformation of boron nitride from the hexagonal to cubic system, more definite and firm bodning or cementing can be formed.

5. And because the bonded bodies are of fine polycrystals in texture, they have no cleavages peculiar to a single crystal material but are higher in toughness than large grain diamond monocrystals or cubic system boron nitride monocrystals. This is the same advantage found in carbonado, a valuable natural product.

6. Diamond is converted into graphite or becomes extinct gradually by oxidation at temperatures in the neighborhood of 1,000°C or higher, particularly in such an oxidizing atmosphere as the air. But boron nitride is more stable in this respect than diamond. In the bonded lumps containing diamond obtained by the processes in this invention, diamond grains are covered with cubic system boron nitride and have only small parts directly exposed to the open atmosphere. Therefore, they are more resistant to heat and oxidation than pure diamond.

7. In steel grinding, diamond consumes itself very much which is a bottle-neck in the practical use, but cubic system boron nitride is known not to react even in contact with iron at high temperatures and give a remarkably smaller amount of consumption when used in grinding steel. It is easily understood that the bonded lumps containing diamond, obtained by the processes in this invention are more advantageous than diamond itself by dint of the above-mentioned stable boron nitride.

In the production of polycrystalline cubic system boron nitride by mixing hexagonal system boron nitride with cubic system boron nitride in this invention, (1) the matrix and fillers are the same compounds (boron nitrides), therefore, the bonding of the both can be carried out quite reasonably. If a part or the whole of the filler is boron nitride in wurtzite structure, the symmetry of the crystal structures of the filler is different from cubic system. But the arrangement of atomic binding around each atom is just the same both in wurtzite form and cubic system crystals. Therefore, it is considered that a reasonable bonding occurs between the filler and the matrix all the same.

Further, (2) when different types of powders, such as soft and slippery hexagonal system and hard cubic system boron nitride powders, are mixed and compressed, the residual pore may be reduced much smaller (that is, the density increases) rather than in the case that each component is compressed separately. Consequently, this is more advantageous than a process in which polycrystalline lumps are obtained by exposing only hexagonal system boron nitride powder to high pressures and temperatures. And (3) in the transformation of hexagonal system boron nitride to cubic system, the body contracts correspondingly to the increase in density and the lump obtained can not but be distorted more or less. But, if cubic system boron nitride is mixed preliminarly, the contraction of the body becomes smaller in correspondence to the mixed amount of the filler and the lump distortion is reduced to a less extent. At the same time the reduction of pressure during the reaction is prevented. Moreover, the polycrystalline cubic system boron nitride lumps obtained by the processes in this invention have the following advantages.

1. They have hardnesses comparable to diamond and are particularly suitable as machine tool materials.

2. Because of the polycrystalline structures, they have no cleavages peculiar to the large grained monocrystals of diamond or cubic system boron nitride but are rich in toughness.

3. Compared with carbon, they are remarkably difficult of oxidation and have better resistance properties than diamond at high temperatures in oxidizing atmosphere. Therefore, they stand well the heavy load caused by heavy cutting and shaving at high temperatures when used as cutting edges of machine tools.

4. Because the filler and the matrix are the same compounds and are materials of extremely small thermal expansion, they are very resistant against thermal shocks.

5. As they do not react with iron, they can cut and shave steel whereas diamond is consumed very much and becomes unusable when used in cutting and shaving steel at high temperatures.

Therefore, the cubic system boron nitride lumps are much better than diamond in grinding and cutting.

6. Since no catalysts are required, the efficiency of utilizing the capacity of the reaction chamber is high so that large lumps can be obtained easily. Therefore, the production costs much less than the production of diamond of the same size.

7. By preparing a suitable shaped reaction container or by a preliminary moulding process of the mixture (for example, hot press), it is possible to manufacture lumps in desired shaped.

FIGS. 1 to 3 show the three examples of the reaction containers used in the Examples of this invention. In FIG. 1, 1 is a tantalum tube 4.2 mm in outer diameter, 8 mm in length, and 0.2 mm in thickness which is a container to accommodate the starting raw materials as well as is a heater for heating in addition. 2 and 3 are end plugs made of graphite 3.8 mm in diameter and 1.5 mm in length. 4 is a reaction space to accomodate the starting raw materials.

In FIG. 2, 1 is a metal tube 4.2 mm in outer diameter, 8 mm in length and 0.2 mm in thickness just as that in FIG. 1, but molybdena, nickel and platinum in addition to tantalum are used as its materials properly as described below. 5 is an aluminum tube 3.8 mm in outer diameter and 2.8 mm in inner diameter, 6 and 7 alumina plugs 2.8 mm. in diameter and 2 mm in length and 8 a reaction space. In FIG. 3, 9 is a graphite tube (a heater) 4.2 mm in outer diameter, 3 mm in inner diameter and 8 mm in length, 10 and 11 graphite plugs 3 mm in diameters and 2 mm in lengths respectively and 12 a reaction space.

After filling the reaction space 4, 8 or 12 with the starting raw materials, the whole container assembly is put into the ultrahigh pressure and high temperature device and applied with high pressure. Then the aforementioned starting raw materials are heated by running electric current through the heater tube, 1 or 9.

Example 1

Hexagonal system boron nitride powder relatively low in crystallinity consisting of primary particles with diameters of about 0.5 micron or less was mixed with such fillers as (1) fine amorphous silica powder ($SiO_2$) less than one micron in particle diameter, (2) alumina powder of No. 2000 grain size for grindstone powders, (3) tungsten carbide powder approximately 1.5 microns in particle diameter (4) nickel oxide fine powder, (5) titanium carbide fine powder, (6) titanium nitride fine powder and (7) aluminum nitride fine powder, at the mixing ratios shown in Table 2, in a ball-mill mixer. The mixtures obtained in the ball-mill mixer where filled in the container shown in FIG. 1 and maintained at 73 Kbar/1,700°C. for 15 minutes respectively by an ultra-high pressure and temperature equipment of the cubic anvil type. As a result, a hard lump was obtained in every case. And it was confirmed by x-ray diffraction, microscopic and electron microscopic tests that the lumps obtained were of structures wherein each filler had been dispersed uniformly in the cubic system boron nitride matrix of fine and dense texture with primary particle size less than one micron. In the case of amorphous silica, the diffraction line corresponding to $SiO_2$ in the X-ray diffraction photo was indistinct, allowing no defnite assignment, but it is expected that the silica is dispersed as coesite, a high pressure modification of silica.

Table 2

| No. | Names of Fillers | Mixing Ratio (boron-nitride:Filler by Weight) | | | | | |
|---|---|---|---|---|---|---|---|
| (1) | Silica | 7:3 | 4:1 | 6:1 | 9:1 | 19:1 | 49:1 |
| (2) | Alumina | 1:1 | 7:3 | 9:1 | | | |
| (3) | Nickel oxide | 9:1 | 19:1 | | | | |
| (4) | Tungusten carbide | 3:4 | 3:2 | 4:1 | | | |
| (5) | Titanium carbide | 19:1 | | | | | |
| (6) | Titanium nitride | 3:1 | 6:1 | | | | |
| (7) | Aluminum nitride | 5:1 | 9:1 | | | | |

Also in the hardness test in the case of silica at the mixing ratio of 6:1, the finished surface of cemented tungsten carbide and the crystal surface of silicon carbide were easily scratched by the product, showing the high hardness of the product. While it is possible to cut and shape the product with a diamond saw. It was the case with the alumina-filled product at the mixing ratio of 9:1. In the case of tungsten carbide-filled product at the mixing ratio of 3:4, a lump weighting 5.7 g/cc was obtained, which is fairly heavier than pure polycrystalline boron nitride (density-3.4-3.48 g/cc). It was also confirmed that, these products were neither dissolved nor decomposed by boiling in a mixture of hydrofluoric and nitric acids for 28 hours. In the case of nickel oxide-filler at the mixing ratio of 9:1, the product was found to be ferro-magnetic and adhere to a magnet.

Example 2

The mixture obtained by adding one part by weight of amorphous silica and alumina, respectively, to 8 parts by weight of the same hexagonal system boron nitride as shown in Example 1 was filled in the container shown in FIG. 1 and maintained at 75 Kbar/1,700°C for 15 minutes to obtain cylindrically formed lumps.

Example 3

The mixed powders obtained by adding one part each of amorphous silica and fine silicon powder to 8 parts by weight of the hexagonal system boron nitride described in Example 1 were filled in the container shown in FIG. 1 and maintained at 70 Kbar/1,600°C for 30 minutes to obtain hard lumps cylindrically formed.

Example 4

The raw materials obtained by mixing fine powder of natural diamond 5 – 10 microns in particle diameter with powder of hexagonal system boron nitride consisting of primary particles of about 1 micron or less at the ratios of 4:1, 3:1, 1:1 and 1:4 by weight respectively were put in the reaction space 4 of the container 1 shown in FIG. 1 and the container was pressured to 75 Kbar with an ultra high pressure and high temperature device of the anvil type and maintained at approximately 1,800°C for 5 minutes. The result was that the composite lumps of polycrystalline cubic system boron nitride and diamond, hard and fairly cylindrical in forms, were obtained at each mixing ratio. They were colored light gray, or deep gray and translucent.

Example 5

When diamond in Example 5 was substituted with artificially synthesized diamond powder of 8 – 14 microns and the mixing ratio was changed into 1:1 by weight, then cylindrical and lump formed composites of polycrystalline cubic system boron nitride and diamond were obtained all the same.

Further, boron nitride powders were replaced by those consisting or primary particles less than 2 microns with the same result obtained.

Example 6

With the raw materials used in Example 4, the mixture of diamond and boron nitride mixed at the ratio of 1:2 was filled in the reaction space 8 of the container shown in FIG. 2 and maintained at 75 Kbar/about 1,700°C for 20 minutes with a tantalum tube 1 used as a heater to obtain lumps of cemented diamond. Further, the heater material was replaced by nickel, molybdenum or platinum in addition to tantalum in this Example, and the mixture was pressured to 75 Kbar and maintained at various temperatures of from 1,600°C to 1,900°C for 20 minutes, respectively. Then, hard tough cylindrically formed composite material of polycrystalline cubic system boron nitride and diamond were obtained in all the case.

Example 7

With the same raw materials as those in Example 4, the mixture obtained at the mixing ratio of 1:1 was filled in the reaction space 12 of the container shown in FIG. 3 and maintained at (a) 60 Kbar/1,600°C for 30 minutes, (b) 73 Kbar/1100°C for 30 minutes, (c) 73 Kbar/1,300°C for 10 minutes, (d) 73 Kbar/1,800°C for 1 minute, (e) 90 Kbar/1,500°C for 2 minutes and (f) 90 Kbar/2,000°C for 1 minute, respectively. The lump formed composites of polycrystalline cubic system boron nitride and diamond were obtained in every case.

Example 8

The same diamond and hexagonal system boron nitride as those in Example 4 were mixed with (a) silica or (b) alumina fine powders at the ratio of 1:1:0.2. The mixture thus obtained was put in the reaction space 4 of the container shown in FIG. 1 and maintained at 78 Kbar/1,800°C for 15 minutes. In both cases of silica and alumina were obtained the cylindrically formed hard composites of the hard materials with polycrystalline cubic system boron nitride and diamond.

Example 9

Two cubic lumps of about 1.2 mm on an edge obtained by precompressing and shaping the same mixture as that in Example 6 were put in the container shown in FIG. 2 and their gaps were filled with fine aluminum powders. After they were kept at 75 Kbar/1,700°C for 10 minutes, cubic lumps of about one mm on an edge consisting of the composite of polycrystalline cubic system boron nitride and diamond were obtained. The color tone in this case was slightly yellowish white.

Example 10

The graphite plug 3 of the container shown in FIG. 1 was changed into a graphite plug 14 with such a V-type channel as is shown in Fig. 4 and the mixture similar to that in Example 6 was accomodated in the reaction space and maintained at 75 Kbar/1,800°C for 15 minutes. Then a lump 16, with an edge 15 as are shown in FIG. 5, consisting of a composite of polycrystalline cubic system boron nitride and diamond were obtained.

When the composite materials of polycrystalline cubic system boron nitride and diamond obtained by each Example above, 4 to 10, were inspected with X-ray diffraction and with an optical microscope and an electron microscope, it was confirmed that diamond particles are cemented with boron nitride converted into cubic system and having a fine and dense polycrystalline texture with grains less than one micron. And the color tone was noted generally grayish white, or deep gray and translucent in most cases except Example 9. And the density was different depending upon the high temperature and pressure treating conditions and the raw materials mixing ratios, but it was generally between 3.43 and 3.51, being close to the theoretical value. In Example 4, for its instance, when the mixing ratio of 1:3 of diamond and boron nitride was selected, it was measured as 3.495±0.005. Further, the hardness was measured as 7200 Kg/mm$^2$ in Knoop scale and, with other speciments of the same types, the lumps were so hard that diamond indenters were broken and the exact measurement was impossible.

Example 11

The raw materials obtained by mixing hexagonal system boron nitride powder consisting of primary particles of such sizes as about one micron or less in particle diameters each, with cubic system boron nitride powders 2–8 microns in particle diameter each obtained by the preliminary synthesis and classification with lithium used as catalyst, were filled in the reaction space 4 of the container 1 shown in FIG. 1 and treated under the conditions shown in the following Table 3. Then cylindrical lumps 2.5–3 mm in diameters and about 4 mm in lengths each were obtained.

The lumps obtained were white or gray in color and translucent.

Table 3

| Mixing ratio by weight (hexagonal system: cubic system) | Pressure (kilo bar) | Temperature (°C) | Maintaining time (minute) |
|---|---|---|---|
| 3:7 | 80 | 1900 | 30 |
| 5:5 | 75 | 1800 | 15 |
| 7:3 | 75 | 1800 | 15 |
| 3:1 | 75 | 1700 | 20 |
| 4:1 | 80 | 1100 | 30 |
| 9:1 | 60 | 1400 | 30 |
| 9:1 | 75 | 1700 | 10 |

Example 12

The raw materials obtained by adding one part by weight of powder obtained by the pulverization and classification of cubic system boron nitride which was obtained by the conversion from hexagonal system without catalysts at high temperatures and under high pressures to 3 parts by weight of hexagonal system boron netride similar to that in Example 11 and by the subsequent mixing thereof were filled in the reaction space 8 of the container shown in FIG. 2 and maintained at 75 Kbar/1,700°C for 15 minutes. Then cylindrical hard lumps were obtained.

Example 13

By filling the mixture similar to that in Example 12 in the container shown in FIG. 3 and then maintaining it at 75 Kbar/1,800°C for 10 minutes, hard lumps were obtained.

Example 14

Two cubes 1.2 mm on edge obtained by shaping of the raw materials mixed in the similar way to Example 12 were put into the reaction space 4 of the container 1 shown in FIG. 1 together with aluminum powders and maintained at 75 Kbar/1,700°C for 15 minutes. Then hard lumps in the cubic form were obtained.

Example 15

Four small lumps, about 1 mm in size, of polycrystalline cubic system boron nitride formed by the application of high pressure and temperature on hexagonal system boron nitride powder under the condition of no catalysts existing were filled in the reaction space 4 of the container 1 shown in FIG. 1 together with the hexagonal system boron nitride powder similar to that in Example 11 and maintained at 70 Kbar/1,700°C for 20 minutes. Then the aforementioned four lumps could be bonded into a larger lump.

Example 16

The mixed raw materials similar to those in Example 12 were filled in the container of FIG. 1, with the graphite plug 14 having the V-type channel 13, as shown in FIG. 4, used instead of the graphite plug 3 and were maintained at 73 Kbar/1,700°C for 15 minutes. Thus, the lump 16 having an edge 15 on one end as is shown in FIG. 5 was obtained.

Example 17

The raw mixture used in the preceding Example was filled in the container shown in FIG. 1 with a tungusten rod 0.5 mm in diameter put along the central axis of the container. When the lump obtained under the condition similar to those in the preceding Example were acid-treated and the tungsten was dissolved, hard lumps in a hollow cylyndrical form were obtained.

Example 18

The raw material obtained by mixing hexagonal system boron nitride powder and cubic system boron nitride powder similar to those used in Example 12 and fine powder of amorphous silica at the ratio by weight of 6:1:1 were filled in the reaction space 4 of the container 1 shown in FIG. 1 and were maintained at 73 Kbar/1,800°C for 20 minutes. Then hard lumps were obtained.

It was confirmed by X-ray diffraction and microscopic or electron microscopic observations that the lumps obtained in Examples 11 to 18 consisted of polycrystalline cubic system boron nitride and particularly that the matrix converted from hexagonal system boron nitrides is of fine textures less than one micron each in gain sizes. The lattice constant of the matrix was 3.62 ± 0.01 A, same as that of single crystalline cubic system boron nitride synthesized with catalysts. And the hardnesses were distributed over a range of 4000 to 8000 Kb/mm$^2$ in Knoop scale, those ranging over 6000 to 8000 existing in many cases. This hardness exceeds those of silicon carbide and boron carbide and was comparable to that of diamond. It was further confirmed in the scratch test that the products could scratch finished surfaces of saphire or crystal surfaces of silicon carbide. The specific gravities were 3.3 to 3.5 g/cc being close to the theroetical value, 3.48 g/cc.

In the comparing test of the lumps obtained in the above-mentioned examples with natural and artificial diamonds in resistance to high temperature particularly that in the oxidizing atmosphere such as air, they were put in an aluminum boat together with natural and artificial diamonds (metal bond grinding grains) and subjected to exposures to high temperatures of from 600°C up to 1,100°C with intervals of 100°C, in succession. Each exposure involved abrupt heating, keeping at the elevated temperature and abrupt cooling to room temperature. As a result, the artificial diamonds became extinct almost completely and the natural diamonds were eroded on the surface like a ground glass by oxidation, but the lumps obtained in the above-mentioned Examples were only slightly oxidized on the surfaces (very thin layers less than 1 micron) with no changes in the qualities at all. Also, despite the thermal shock by aburpt heating and cooling between 1,100°C and room temperature, no symptom of disintegration or cracking was noted. Thus, it was demonstrated that the lumps obtained by the processes in this invention were better than diamond in high temperature resistance and satisfactorily stable against thermal shock.

Further, it was possible to apply nickel or copper plating to the lumps obtained in the above-mentioned Examples 11 to 18, and solder them to other materials (a metal bar, for example).

As explained above, polycrystalline cubic system boron nitride lumps and the composites thereof with the hard materials can be made to have diverse qualities to meet a wide range of uses. For example, a wide range of hardness, from that of cubic system boron nitride as hard as diamond, till that as low as quartz, can be obtained, by managing the types of the fillers and their mixing ratios. Particularly, they can fill the fairly wide gaps in hardness found so far between diamond and a group of materials comprising silicon carbide, boron carbide and tungsten carbide.

Consequently, they are particularly well suited to machine tool materials and phonograph needles, and can also be utilized in such uses as has been impossible with tungsten carbide or silicon carbide tools so far. Also, they have advantages of being worked, shaped or finished into machine tools easily by lowering their hardnesses to some extent in comparison with diamond. On the contrary, if diamond itself is made into a machine tool, it is difficult to work and shape it. As lumps large enough to meet the uses for machine tool and dies can be obtained easily, tools and dies made of such lumps can be made remarkably cheaper than the conventional ones made of large diamond grains. (Large grained diamonds used for such tools as bits, and dies are limited to naturally produced ones only). Further, by changing the shape of the reaction container or preliminarily molding the mixture of the raw material and the fillers into a suitable shape, lumps with desired shapes can be produced. Moreover, when used for machine tools, these lumps have advantages of supplying new edges always (self edging) by rubbing off of the filled particles if the filler is softer than cubic system boron nitride. In addition, because the obtained cubic system boron nitride is of fine and dense polycrystalline texture, they are rich in toughness.

What we claim is:

1. A hard mass comprising a matrix and a dispersed phase substantially comprising more than ten percent by weight of polycrystalline cubic system boron nitride as the matrix and granular diamond homogenously dispersed within and bonded by the polycrystalline cubic system boron nitride matrix.

2. The hard mass according to claim 1, containing at least one granular hard material selected from the group consisting of borides of titanium, zirconium, hafnium, vanadium, niobium, tantalum, chromium, molybdenum and tungsten, carbides of these metals, nitrides of these metals, boron carbide, silicon carbide, aluminum nitride, silicon nitride, alumina, silica, iron oxide, nickel oxide, chromic oxide, garnet and agate dispersed in said matrix in addition to said dispersed diamond.

3. The hard mass according to claim 1, wherein the mass further contains at least one metal selected from the group consisting of Ti, Zr, Hf, V, Nb, Ta, Cr, Mo, W, Mn, Fe and Si.

4. The hard mass according to claim 1 wherein the amount of said polycrystalline cubic system boron nitride is more than 20 percent by weight.

5. The hard mass according to claim 1, wherein the mass further contains at least one metal selected from the group consisting of Ti, Zr, Hf, V, Nb, Ta, Cr, Mo, W, Mn, Fe and Si.

6. A process for manufacturing hard masses which comprises maintaining a mixture of hexagonal system boron nitride powder the main part of which is less than 3 microns in diameter in terms of the primary particles and the powder of a hard material at a temperature of at least 1,100°C and under a pressure ranging from 60 K bar to 100 K bar, the combination of said temperature and pressure being within the thermodynamically stable area of cubic system boron nitride, thereby converting the said hexagonal system boron nitride into a polycrystalline cubic system boron nitride matrix with the said powder hard material dispersed uniformly in said matrix.

7. The process according to claim 6, wherein said powder hard material is selected from the group consisting of borides of titanium, zirconium, hafnium, vanadium, niobium, tantalum, chromium, molybdenum and tungsten, carbides of these metals, nitrides of these metals, boron carbide, silicon carbide, aluminum nitride, silicon nitride, alumina, silica, iron oxide, nickel oxide, chromic oxide, cubic system boron nitride, garnet and agate.

8. The process according to claim 7, wherein said mixture further contains at least one metal selected from the group consisting of Ti, Zr, Hf, V, Nb, Ta, Cr, Mo, W, Mn, Fe and Si.

9. The process according to claim 6, wherein said powder hard material is diamond.

10. The process according to claim 9 wherein said mixture further contains at least one metal selected from the group consisting of Ti, Zr, Hf, V, Nb, Ta, Cr, Mo, W, Mn, Fe and Si.

11. The process according to claim 6 wherein said hexagonal system boron nitride powder is less than 3 microns in diameter.

12. The proces according to claim 9 wherein said hexagonal system boron nitride powder is less than 3 microns in diameter.

* * * * *